US012097525B2

(12) United States Patent
Cho

(10) Patent No.: US 12,097,525 B2
(45) Date of Patent: Sep. 24, 2024

(54) SUBSTRATE TREATING APPARATUS, AND METHOD OF CONTROLLING THE SUBSTRATE TREATING APPARATUS

(71) Applicant: SEMES CO., LTD., Cheonan-si (KR)

(72) Inventor: Cheon Su Cho, Pyeongtaek-si (KR)

(73) Assignee: Semes Co., Ltd., Chungcheongnam-do (KR)

( * ) Notice: Subject to any disclaimer, the term of this patent is extended or adjusted under 35 U.S.C. 154(b) by 105 days.

(21) Appl. No.: 17/960,394

(22) Filed: Oct. 5, 2022

(65) Prior Publication Data

US 2023/0118197 A1 Apr. 20, 2023

(30) Foreign Application Priority Data

Oct. 18, 2021 (KR) ........................ 10-2021-0138773

(51) Int. Cl.
*B05C 11/00* (2006.01)
*B05C 5/02* (2006.01)

(52) U.S. Cl.
CPC ............ *B05C 11/00* (2013.01); *B05C 5/0208* (2013.01)

(58) Field of Classification Search
USPC .......................................................... 118/708
See application file for complete search history.

(56) References Cited

U.S. PATENT DOCUMENTS

| | | | | | |
|---|---|---|---|---|---|
| 5,698,163 | A * | 12/1997 | Mandel | G05D 21/02 422/111 |
| 6,761,770 | B2 * | 7/2004 | Bartholomew | C23C 16/453 118/712 |
| 2017/0320331 | A1 | 11/2017 | Alessi et al. | |
| 2021/0205831 | A1 * | 7/2021 | Nakura | B05B 14/40 |
| 2022/0208562 | A1 * | 6/2022 | Park | H01L 21/6719 |
| 2024/0050969 | A1 * | 2/2024 | Ueda | B05C 11/00 |

FOREIGN PATENT DOCUMENTS

| | | | | | |
|---|---|---|---|---|---|
| JP | 2014-034194 | A | | 2/2014 | |
| JP | 2015-167934 | A | | 9/2015 | |
| JP | 2016-060056 | A | | 4/2016 | |
| KR | 10-2019-0084922 | A | | 7/2019 | |
| KR | 20190084922 | A | * | 7/2019 | B41J 2/01 |
| KR | 10-2020-0060877 | A | | 6/2020 | |
| KR | 10-2021-0087731 | A | | 7/2021 | |

* cited by examiner

*Primary Examiner* — Jethro M. Pence
(74) *Attorney, Agent, or Firm* — Harness, Dickey & Pierce, P.L.C.

(57) ABSTRACT

The inventive concept provides a substrate treating apparatus. The substrate treating apparatus includes a head unit configured to discharge an ink to a substrate; a supply unit configured to supply the ink to the head unit and including a reservoir having an inner space; and a pressure adjusting unit configured to adjust a pressure of the inner space, and wherein the pressure adjusting unit comprises: a first pressure adjusting unit; and a second pressure adjusting unit in which a size for changing a pressure of the inner space per unit time is greater than the first pressure adjusting unit.

11 Claims, 7 Drawing Sheets

SUBSTRATE TREATING APPARATUS, AND METHOD OF CONTROLLING THE SUBSTRATE TREATING APPARATUS

CROSS-REFERENCE TO RELATED APPLICATIONS

A claim for priority under 35 U.S.C. § 119 is made to Korean Patent Application No. 10-2021-0138773 filed on Oct. 18, 2021, in the Korean Intellectual Property Office, the entire contents of which are hereby incorporated by reference.

BACKGROUND

Embodiments of the inventive concept described herein relate to a substrate treating apparatus and a method for controlling the substrate treating apparatus.

Recently, there has been a need to manufacture display devices such as a liquid crystal display device and an organic EL display device having a high resolution. In order to manufacture a display device having a high resolution, more pixels per unit area should be formed on a substrate such as a glass, and it is important to discharge an ink droplet to an accurate position in an accurate amount at each of the densely arranged pixels.

It is necessary to prevent an ink from flowing down to a nozzle surface of an inkjet head discharging the ink, or to prevent the ink from forming at an end portion of the inkjet head. This is because if the ink flows down to the nozzle surface of the inkjet head or if the ink is formed at the end portion of the nozzle, the ink may be solidified by an exposure to the outer air. A solidified ink may be transferred to the substrate such as a glass to contaminate the substrate. In some cases, the solidified ink may block the nozzle of the head. To solve this problem, it is important to maintain a meniscus state in which the ink forms a concave liquid film toward an inside of the end portion of the nozzle by applying a slight negative pressure to the inner space of a reservoir storing the ink in an atmospheric state at which the ink is not discharged.

On the other hand, if the head supplies the ink, the inner space of the reservoir is pressurized, and then the inner space of the reservoir is depressurized to maintain the meniscus state. That is, the inner space of the reservoir is switched between the positive pressure and the negative pressure. If a pressure of the inner space is switched from the positive pressure to the negative pressure for a long time, a wetting phenomenon at which the ink is formed at the end portion of the nozzle by gravity can occur.

In order to reduce a time required to change the pressure of the inner space, a method of increasing a hole size of a servo valve of a pressure controller which controls the pressure of the inner space of the reservoir may be considered. However, if the hole size of the servo valve is increased, it becomes difficult for the pressure controller to precisely control the pressure in the inner space of the reservoir.

SUMMARY

Embodiments of the inventive concept provide a substrate treating apparatus and a substrate treating method for effectively controlling a pressure of an inner space of a reservoir.

Embodiments of the inventive concept provide a substrate treating apparatus and a substrate treating method for reducing a time required for changing a pressure, while changing a pressure of an inner space of a reservoir between a positive pressure and a negative pressure.

Embodiments of the inventive concept provide a substrate treating apparatus and a substrate treating method for minimizing an occurrence of a wetting phenomenon of an ink forming on a nozzle surface of a head.

The technical objectives of the inventive concept are not limited to the above-mentioned ones, and the other unmentioned technical objects will become apparent to those skilled in the art from the following description.

The inventive concept provides a substrate treating apparatus. The substrate treating apparatus includes a head unit configured to discharge an ink to a substrate; a supply unit configured to supply the ink to the head unit and including a reservoir having an inner space; and a pressure adjusting unit configured to adjust a pressure of the inner space, and wherein the pressure adjusting unit includes: a first pressure adjusting unit; and a second pressure adjusting unit in which a size for changing a pressure of the inner space per unit time is greater than the first pressure adjusting unit.

In an embodiment, the substrate treating apparatus further includes a controller for controlling the pressure adjusting unit, and wherein the controller controls the pressure adjusting unit so the first pressure adjusting unit changes the pressure of the inner space, after the second pressure adjusting unit changes the pressure of the inner space while the pressure of the inner space is changed from a first pressure to a second pressure which is different from the first pressure.

In an embodiment, the controller controls the pressure adjusting unit so the first pressure adjusting unit changes the pressure of the inner space, after the second pressure adjusting unit changes the pressure of the inner space while the pressure of the inner space is changed from an atmospheric pressure or a positive pressure to a negative pressure.

In an embodiment, the supply unit further comprises a pressure measuring sensor for measuring the pressure of the inner space.

In an embodiment, the controller controls the pressure adjusting unit so the first pressure adjusting unit adjust the pressure of the inner space, if the second pressure adjusting unit adjust the pressure of the inner space and the pressure of the inner space measured by the pressure measuring sensor reaches a predetermined pressure.

In an embodiment, the second pressure adjusting unit includes: a depressurizing member constantly depressurizing during an operation; a depressurizing line for transferring the depressurizing provided by the depressurizing member to the inner space; and a depressurizing valve installed at the depressurizing line.

In an embodiment, the first pressure adjusting unit includes: a positive pressure providing member configured to provide the positive pressure to the inner space; a negative pressure providing member configured to provide the negative pressure to the inner space; and a pressure line transferring a pressure provided by the positive pressure providing member or the negative pressure providing member to the inner space.

In an embodiment, the first pressure adjusting unit further comprises a survo valve installed between the positive pressure providing member and/or the negative pressure providing member, and the reservoir.

The inventive concept provides a method for controlling a substrate treating apparatus. The method includes pressurizing and thereby increasing a pressure of an inner space of a reservoir storing an ink discharged by a head unit; adjusting the pressure of the inner space to a first pressure after the pressurizing; and adjusting the pressure of the inner space to a second pressure which is different from the first pressure after the adjusting the pressure of the inner space to the first pressure, and wherein a pressure change amount in the inner space per unit time at the adjusting the pressure of the inner space to the first pressure is different from a pressure change amount in the inner space per unit time at the adjusting the pressure of the inner space to the second pressure.

In an embodiment, the pressure change amount in the inner space per unit time at the adjusting the pressure of the inner space to the first pressure is smaller than the pressure change amount in the inner space per unit time at the adjusting the pressure of the inner space to the second pressure.

In an embodiment, the pressurizing pressurizes the pressure of the inner space from a negative pressure to an atmospheric pressure, or from the negative pressure to a positive pressure.

In an embodiment, the pressurizing pressurizes the inner space so the pressure of the inner space becomes the positive pressure to purge the head unit by transferring an ink stored in the inner space to the head unit.

In an embodiment, the pressurizing opens the inner space to the atmosphere so the pressure of the inner space becomes the atmospheric pressure to supply the ink from a canister to the inner space.

According to an embodiment of the inventive concept, a pressure of an inner space of a reservoir may be effectively controlled.

According to an embodiment of the inventive concept, a time required for a pressure change may be reduced while a pressure of an inner space of a reservoir is changed between a positive pressure and a negative pressure.

According to an embodiment of the inventive concept, a wetting phenomenon of an ink forming on a nozzle surface of a head may be minimized.

The effects of the inventive concept are not limited to the above-mentioned ones, and the other unmentioned effects will become apparent to those skilled in the art from the following description.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
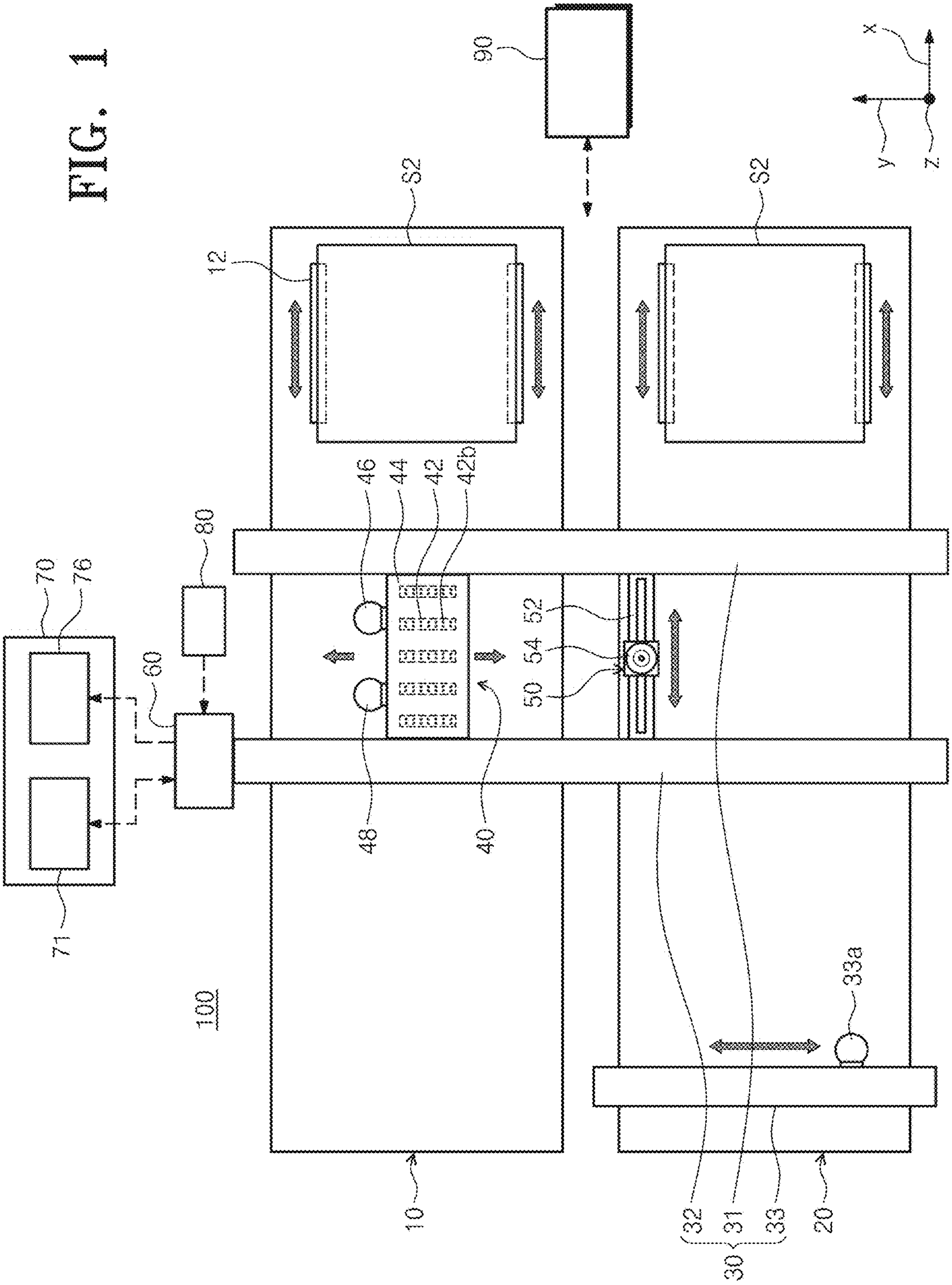
FIG. 1 illustrates a substrate treating apparatus according to an embodiment of the inventive concept.

The inventive concept may be variously modified and may have various forms, and specific embodiments thereof will be illustrated in the drawings and described in detail. However, the embodiments according to the concept of the inventive concept are not intended to limit the specific disclosed forms, and it should be understood that the present inventive concept includes all transforms, equivalents, and replacements included in the spirit and technical scope of the inventive concept. In a description of the inventive concept, a detailed description of related known technologies may be omitted when it may make the essence of the inventive concept unclear.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

It should be understood that when an element or layer is referred to as being "connected to" or "coupled to" another element or layer, it may be connected to, coupled to, or covering the other element or layer or intervening elements or layers may be present. In contrast, when an element is referred to as being "directly connected to," or "directly coupled to" another element or layer, there are no intervening elements or layers present. Other terms such as "between", "adjacent", "near" or the like should be interpreted in the same way.

Unless otherwise defined, all terms used herein, including technical or scientific terms, have the same meaning as those generally understood by those skilled in the art to which the inventive concept belongs. Terms such as those defined in commonly used dictionaries should be interpreted as consistent with the context of the relevant technology and not as ideal or excessively formal unless clearly defined in this application.

Hereinafter, an embodiment of the inventive concept will be described with reference to FIG. 1 to FIG. 10.

FIG. 1 illustrates a substrate treating apparatus according to an embodiment of the inventive concept.

Referring to FIG. 1, the substrate treating apparatus 100 according to an embodiment of the inventive concept may be an inkjet apparatus that treats a substrate by supplying a treating liquid such as an ink onto the substrate S. The substrate S may include a first substrate S1, which is to be treated, and a second substrate S2, which is a dummy substrate used to correct an impact position, a discharge timing, and the like, of an ink I in a droplet form discharged onto the first substrate S1. In addition, the substrate S may be a glass. The substrate treating apparatus 100 may perform a printing process on the substrate S by discharging the ink droplet onto the substrate S.

The substrate treating apparatus 100 may include a printing unit 10, a maintenance unit 20, a gantry 30, a head unit 40, a nozzle alignment unit 50, a supply unit 60, a pressure adjusting unit 70, a canister 80, and a controller 90.

When viewed from above, the printing unit 10 may be provided with its lengthwise direction in a first direction X. Hereinafter, when viewed from above, a direction perpendicular to the first direction X is referred to as a second direction Y, and a direction perpendicular to the first direction X and the second direction Y is referred to as a third direction Z. The third direction Z may be a direction perpendicular to the ground. In addition, the first direction X may be a direction in which a first substrate S1 to be described later is transferred by the transfer member 12. In the printing unit 10, a printing process on the first substrate S1 may be performed by discharging the ink from the head unit 40 to be described later to the first substrate S1.

In addition, the first substrate S1 transferred from the printing unit 10 may be maintained in a floating state. Accordingly, the printing unit 10 may be provided with a floating stage capable of floating the first substrate S1 when transferring the first substrate S1. The floating stage may supply an air to a bottom surface of the first substrate S1 to allow the first substrate S1 to float.

The transfer member 12 may grip one or both sides of the first substrate S1 in the printing unit 10 to move the first substrate S1 along the first direction X. The transfer member 12 may grip a bottom surface of an edge region of the first substrate S1 in a vacuum suction method. The transfer member 12 may move along a guide rail provided in the lengthwise direction of the printing unit 10. That is, the transfer unit 70 may include a guide rail provided along one side or both sides of the floating stage, and a gripper gliding along the guide rail while holding one side or both sides of the first substrate S1.

In addition, the maintenance unit 20 is also provided with a transfer member having the same structure and/or similar function as the transfer member 12 provided to the printing unit 10, and so the maintenance unit 20 may move the second substrate S2 in the first direction X.

A maintenance of the head unit 40 to be described later may be mainly performed at the maintenance unit 20. For example, the maintenance unit 20 may check a state of the head unit 40 or may perform a cleaning of the head unit 40. When viewed from above, the maintenance unit 20 may be provided with its lengthwise direction in the first direction X. In addition, the maintenance unit 20 may be disposed side by side with the printing unit 10. For example, the maintenance unit 20 and the printing unit 10 may be arranged in parallel in the second direction Y.

In addition, in the case of the maintenance unit 20, since the ink I in the droplet form may be discharged for an impact position correction, a volume adjustment of the ink I, and a discharge volume control of the ink I, etc of the ink in the droplet form discharged by the head unit 40 to be described later, the maintenance unit 20 may have the same or a similar process environment as the printing unit 10.

The gantry 30 may be provided such that the head unit 40 to be described later or a fourth vision unit 60 to be described later may go back and forth in a straight line. The gantry 30 may include a first gantry 31, a second gantry 32, and a third gantry 33. The first gantry 31 and the second gantry 32 may be provided to have a structure extending along the printing unit 10 and the maintenance unit 20. In addition, the first gantry 31 and the second gantry 32 may be disposed to be spaced apart from each other in the first direction X. That is, the first gantry 31 and the second gantry 32 may be provided to have a structure extending in the second direction Y in which the printing unit 10 and the maintenance unit 20 are disposed so that the head unit 40 to be described later may move in the second direction Y.

In addition, the third gantry 33 may be provided to have a structure in which the printing unit 10 extends along the second direction Y. That is, the third gantry 33 may be provided to have a structure in which the fourth vision unit 33*a* extends to move along the second direction Y. The fourth vision unit 33*a* may go back and forth along the third gantry 33 to obtain an image capable of confirming an impact position of the ink I in the droplet form discharged from the maintenance unit 20 and a volume of the ink droplet I. For example, the head unit 40 may discharge the ink droplet to a calibration board, for example, the second substrate S2, which may be provided to the maintenance unit 20. The second substrate S2 may be moved to a bottom region of the fourth vision unit 33*a*, and the fourth vision unit 33*a* may obtain an image of the second substrate S2 from which the ink droplet is discharged. The image acquired by the fourth vision unit 33*a* may be transmitted to the controller 90. The fourth vision unit 33*a* may be a camera including an image acquisition module.

Figure 2:
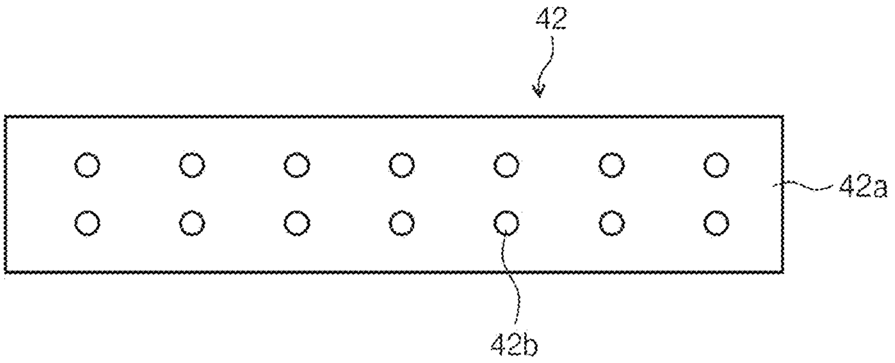
FIG. 2 is a bottom view of a nozzle surface of a head of FIG. 1.

FIG. 2 illustrates a nozzle plate of the head of FIG. 1.

Referring to FIG. 1 and FIG. 2, the head unit 40 may discharge the ink I in the droplet form to the substrate S. The head unit 40 may perform a printing process on the substrate S by discharging the ink I to the substrate S. For example, the head unit 40 may perform a printing process on the substrate S by discharging the ink I on the substrate S while going back and forth along the second direction Y. For example, the head unit 40 may discharge the ink I to the first substrate S1 moving in the first direction X. If the first substrate S1 enters an area below the head unit 40 and then deviates from the area below the head unit 40, the head unit 40 may move along the second direction Y to change the discharge position of the ink I. If the discharge position of the ink I of the head unit 40 is changed, the first substrate S1 may move along the first direction X, but may move in a direction opposite to the direction previously moved. While the first substrate S1 moves in the reverse direction, the head unit 40 may discharge the ink I.

The head unit 40 may include an ink storage member 41, a head 42, a discharge member 43, a head frame 44, a head interface board 45, a first vision unit 46, and a second vision unit 48. The head unit 40 may discharge the ink in a form of a droplet to the substrate S being moved by the above-descripted transfer unit 70 at a speed.

The head 42 may be provided in a plurality. The plurality of heads 42 may be arranged side by side along the first direction X. The plurality of heads 42 may be fitted to the head frame 44. In addition, at least one nozzle 42*b* may be formed at the head 42. The nozzle surface 41*a* at which the nozzles 42*b* are formed may be parallel to a top surface of the substrate S.

Also, the head unit 40 may include a discharge member (not shown) for discharging the ink I. The discharge member may be a piezoelectric element. The discharge member 43 may receive a droplet discharge signal from the controller 90 to implement a liquid discharge operation of the head unit 40.

The first vision unit 46 and the second vision unit 48 may be installed at the head frame 44. In addition, when seen from above, the first vision portion 46 and the second vision portion 48 may be coupled to a side of the head 42. The first vision unit 46 and the second vision unit 48 may obtain an image capable of identifying the impact position of the ink droplet discharged from the head unit 40 to the substrate S and a volume of the ink droplet. For example, when the head unit 40 discharges the ink droplet to the substrate S provided at the printing unit 10, the first vision unit 46 and the second vision unit 48 may photograph the substrate S, and the captured image may be transmitted to the controller 90. The user may check the impact position of the ink droplet discharged to the substrate S or the volume of the ink droplet through the image captured by the first vision unit 46 and the second vision unit 48 transferred to the controller 90. The first vision unit 46 and the second vision unit 48 may be arranged side by side in the first direction X. The first vision unit 46 and the second vision unit 48 may be cameras capable of identifying the ink droplets discharged by the head 42.

The head 42 may be movably coupled to the first gantry 31 and the second gantry 32 via the head frame 44. For example, the head 42 may be provided to be movable along the second direction Y, which is the lengthwise direction of the first gantry 31 and the second gantry 32. In addition, the head 42 may go back and forth between the printing unit 10 and the maintenance unit 20 along the second direction Y, which is the lengthwise direction of the first gantry 31 and the second gantry 32.

Referring back to FIG. 1, the nozzle alignment unit 50 may be provided to the maintenance unit 20. The nozzle alignment unit 50 may be provided between the first gantry 31 and the second gantry 32 when viewed from above. Accordingly, the nozzle alignment unit 50 may check a states of the nozzles 42*b* formed at the head 42. For example, the nozzle alignment unit 50 may include a moving rail 52 and the third vision unit 54. A lengthwise direction of the moving rail 52 may be the first direction X. The third vision unit 54 may go back and forth along the first direction X, which is the lengthwise direction of the moving rail 52. The third vision unit 54 may photograph the nozzles 42*b* of the head 42 while moving along the lengthwise direction of the moving rail 52.

Figure 3:
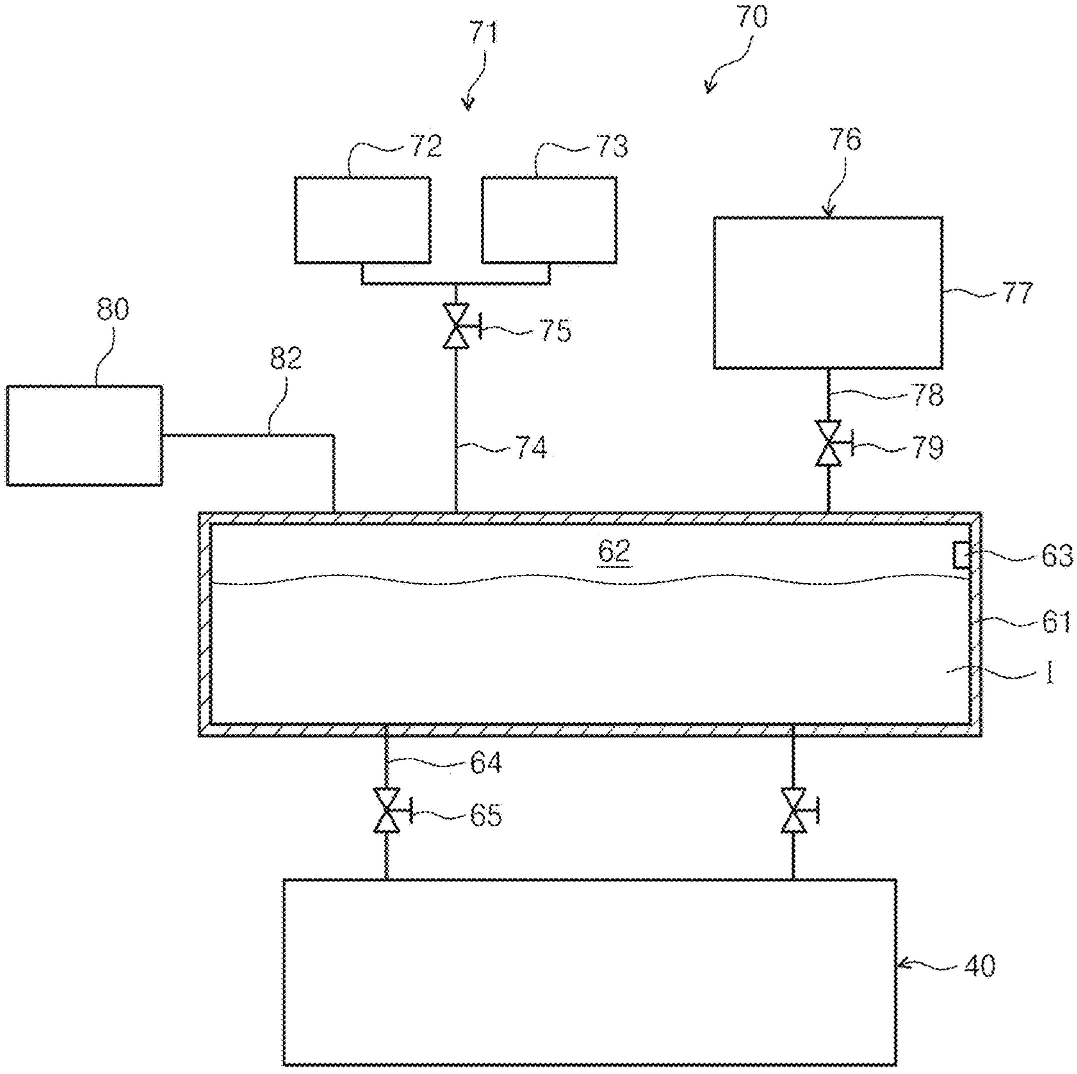
FIG. 3 is a block view schematically illustrating a head unit, a supply unit, and a pressure adjusting unit of FIG. 1.

FIG. 3 is a block view schematically illustrating a head unit, a supply unit, and a pressure adjusting unit of FIG. 1.

Referring to FIG. 3, the supply unit 60 may supply the ink I to the head unit 40. The supply unit 60 may include a reservoir 61, a pressure measuring sensor 63, a supply line 64, and a supply valve 65.

The reservoir 61 may have an inner space 62. The reservoir 61 may store the ink I transferred to the head unit 40. The reservoir 61 may be disposed between the head unit 40 and the canister 80 to be described later. The pressure measuring sensor 63 may be disposed in the inner space 62 of the reservoir 61. The pressure measuring sensor 63 may measure a pressure of the inner space 62. The pressure measuring sensor 63 may measure the pressure of the inner space 62 and transmit the measured pressure measurement value of the inner space 62 to the controller 90 to be described later. In addition, a flow member (not shown) for maintaining a fluidity of the ink I may be installed in the inner space 62. If the ink I does not flow in the inner space 62, it may be solidified in the inner space 62, and the flow member may minimize an occurrence of a solidification of the ink I by flowing the ink I in the inner space 62.

The supply line 64 may transfer the ink I stored/accommodated in the inner space 62 of the reservoir 61 to the head unit 40. The supply line 64 may transfer the ink I stored/accommodated in the inner space 62 to the head unit 40, and the head unit 40 which has received the ink I may discharge the ink I to the substrate S. A supply valve 65 may be installed at the supply line 64. The supply valve 65 may be an on/off valve or a flow rate control valve capable of adjusting an amount of ink per unit time transferred to the head unit 40 through the supply line 64.

The pressure adjusting unit 70 may adjust the pressure of the inner space 62. The pressure adjusting unit 70 may increase the pressure of the inner space 62 by supplying an inert gas, such as a nitrogen gas, to the inner space 62. In addition, the pressure adjusting unit 70 may reduce the pressure of the inner space 62 by depressurizing the inner space 62 in a vacuum suction method. In addition, the pressure adjusting unit 70 may open the inner space 62 to an atmospheric pressure so that the pressure of the inner space 62 reaches the atmospheric pressure. The pressure adjusting unit 70 may switch the pressure of the inner space 62 between a positive pressure and a negative pressure. For example, the pressure adjusting unit 70 may pressurize the inner space 62 during a purging for a care of the head unit 40. For example, while purging the head unit 40, the pressure adjusting unit 70 may pressurize the inner space 62 so that the pressure of the inner space 62 becomes 200 Kpa. In addition, the pressure adjusting unit 70 may depressurize the inner space 62 to maintain a meniscus state at an end portion of the nozzle 42*b*. For example, the pressure adjusting unit 70 may depressurize the inner space 62 so that the pressure of the inner space 62 becomes −5 Kpa.

The pressure adjusting unit 70 may include a first pressure adjusting unit 71 and a second pressure adjusting unit 76. The first pressure adjusting unit 71 may adjust the pressure of the inner space 62. The first pressure adjusting unit 71 may provide the positive pressure or the negative pressure to the inner space 62. The second pressure adjusting unit 76 may adjust the pressure of the inner space 62. The second pressure adjusting unit 71 may provide the negative pressure among the positive pressure and the negative pressure, to the inner space 62. The first pressure adjusting unit 71 may adjust the pressure of the inner space 62 more precisely than the second pressure adjusting unit 76. For example, a rate of change in which the second pressure adjusting unit 76 changes the pressure of the inner space 62 per unit time may be greater than that of the first pressure adjusting unit 71. The first pressure adjusting unit 71 may be an element for maintaining a meniscus state of the end portion of the nozzle 41*b* to be described later. For example, the first pressure adjusting unit 71 may be referred to as a meniscus pressure controller (MPC). In addition, the second pressure adjusting unit 76 may be referred to as an electrical regulator. In addition, the first pressure adjusting unit 71 may open the inner space 62 to the atmosphere so that the pressure of the inner space 62 reaches the atmospheric pressure.

The first pressure adjusting unit 71 may include a positive pressure providing member 72, a negative pressure providing member 73, a pressure line 74, and a servo valve 75.

The positive pressure providing member 72 may provide the positive pressure to the inner space 62. The positive pressure providing member 72 may pressurize the inner space 62 by supplying an inert gas, for example, a nitrogen gas, to the inner space 62. The negative pressure providing member 73 may provide the negative pressure to the inner space 62. The negative pressure providing member 73 may provide the negative pressure to the inner space 62 in the vacuum suction method. The pressure line 74 may transfer a pressure (the positive pressure or the negative pressure) provided by the positive pressure providing member 72 or the negative pressure providing member 73 to the inner space 62. The valve 75 may be installed at the pressure line 74. A hole size of the servo valve 75 may be about Φ 0.4 to Φ 1.5 mm. For example, the hole size of the servo valve 75 may be about Φ 0.4. As the hole size of the servo valve 75 becomes smaller, a pressure provided by the first pressure adjusting unit 71 may be precisely controlled. A precision of the pressure provided by the first pressure adjusting unit 71 may be about ±15 Pa.

The second pressure adjusting unit 76 may depressurize the inner space 62. The second pressure adjusting unit 76 may include a depressurizing member 77, a depressurizing line 78, and a depressurizing valve 79. The depressurizing member 77 may depressurize the inner space 62 in a vacuum suction method. The depressurizing member 77 may include a vacuum pump. The depressurizing member 77 may constantly provide a depressurizing during an operation. A pressure provided by the depressurizing member 77 may be transferred to the inner space 62 through the depressurizing line 78. The depressurizing valve 79 may be installed in the depressurizing line 78. The depressurizing valve 79 may be an on/off valve. Since the depressurizing member 77 always provides a depressurizing during operation, whether the depressurizing generated by the depressurizing member 77 is transmitted to the inner space 62 may vary depending on the on/off of the depressurizing valve 79. For example, if the depressurizing valve 79 is turned on, the depressurizing generated by the depressurizing member 77 may be transferred to the inner space 62. On the other hand, if the depressurizing valve 79 is turned off, the depressurizing generated by the depressurizing valve 79 may not be transferred to the inner space 62 but may be blocked.

Also, as described above, the rate of change of the second pressure adjusting unit 76 for changing the pressure of the inner space 62 per unit time may be larger than that of the first pressure adjusting unit 71. In addition, the first pressure adjusting unit 71 may have a greater control precision for a pressure control of the inner space 62 than that of the second pressure adjusting unit 76.

The canister 80 may be configured to supply the ink I to the inner space 62. The canister 80 is for supplying the ink I to the reservoir 61 and may be configured to have a structure such as a storage tank for storing the ink I. Since the canister 80 has the same structure as the storage tank, it may be disposed at a place somewhat spaced apart from the reservoir 61. In addition, since the canister 80 is disposed at a place somewhat spaced apart from the reservoir 61, it may be configured to supply the ink I to the reservoir 61 using a pressurization.

The canister 80 may supply the ink to the inner space 62 through a transmission line 82. The canister 80 may directly supply the ink I to the inner space 62. Selectively, a buffer reservoir (not shown) is disposed between the canister 80 and the reservoir 61, and the canister 80 may indirectly supply the ink I to the inner space 62. The canister 80 may supply the ink I to the buffer reservoir, and the buffer reservoir may supply the ink to the reservoir 61.

The controller 90 may control the substrate treating apparatus 100. The controller 90 may control the substrate treating apparatus 100 so that the substrate treating apparatus 100 may perform the printing process on the substrate S. In addition, the controller 90 may control the head unit 40 so that the head unit 40 of the substrate treating apparatus 100 may discharge the ink droplet to the substrate S to perform the printing process on the substrate S, for example, the first substrate S1.

The controller 90 may also be configured as a computer program stored in a computer-readable medium, including at least one processor that executes a controlling of the substrate treating apparatus 100, including instructions for such a processor to perform operations for controlling the substrate treating apparatus 100. In addition, the controller 90 may include a user interface formed of a keyboard in which an operator performs a command input operation to manage the substrate treating apparatus 100, a display for visualizing and displaying an operating state of the substrate treating apparatus 100, and the like. In addition, the user interface and a storage unit may be connected to the processor.

Figure 4:
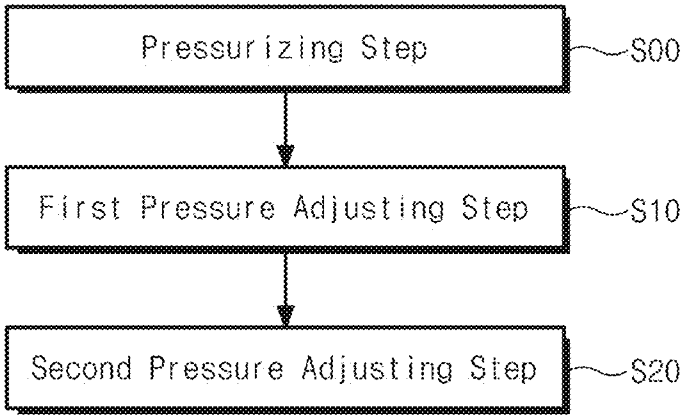
FIG. 4 is a flowchart illustrating a control method of the substrate treating apparatus according to an embodiment of the inventive concept.
Figure 5:
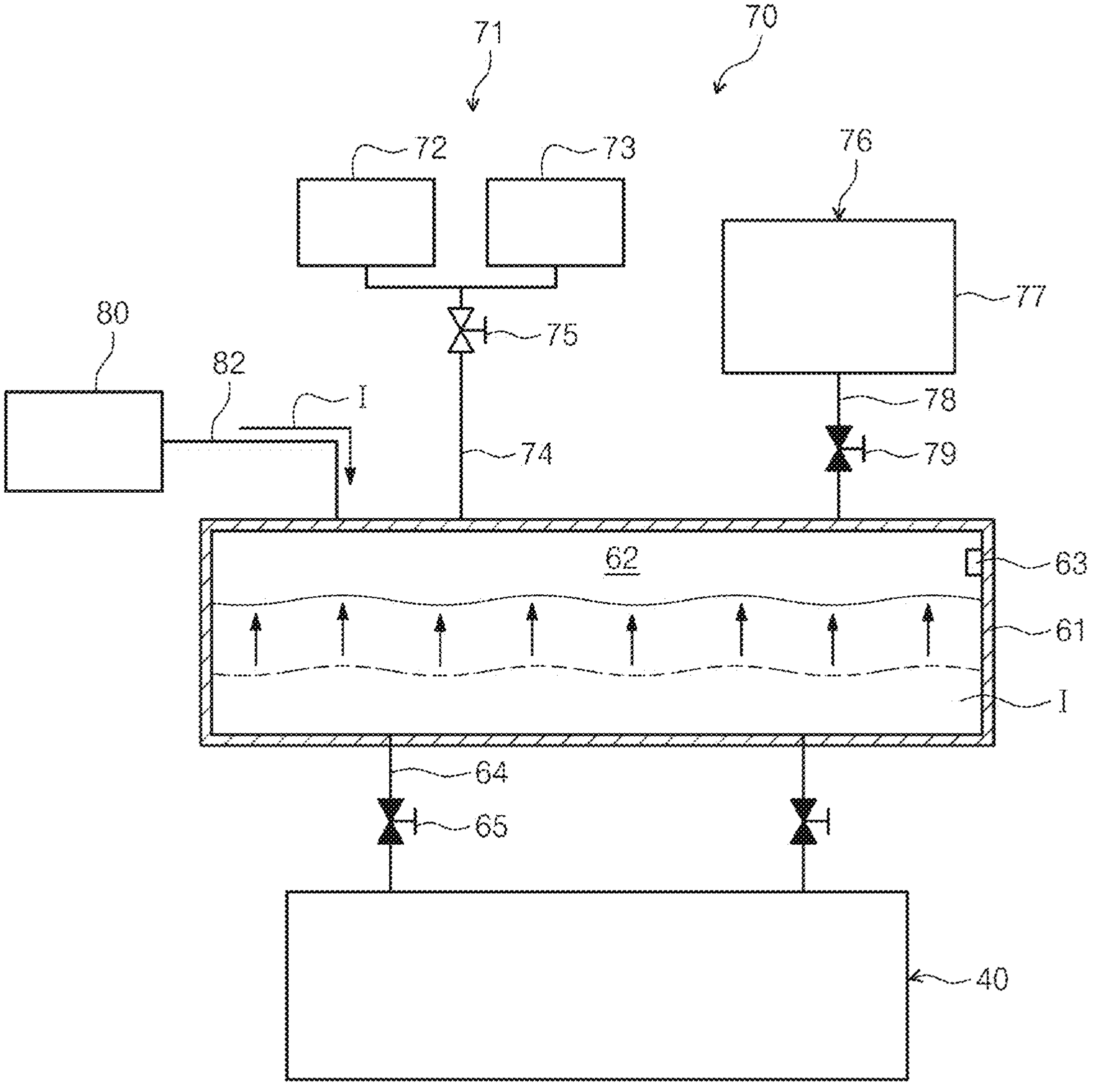
FIG. 5 illustrates a state of a head unit, a supply unit, and a pressure adjusting unit in an adjusting a pressure of an inner space to a first pressure of FIG. 4.
Figure 6:
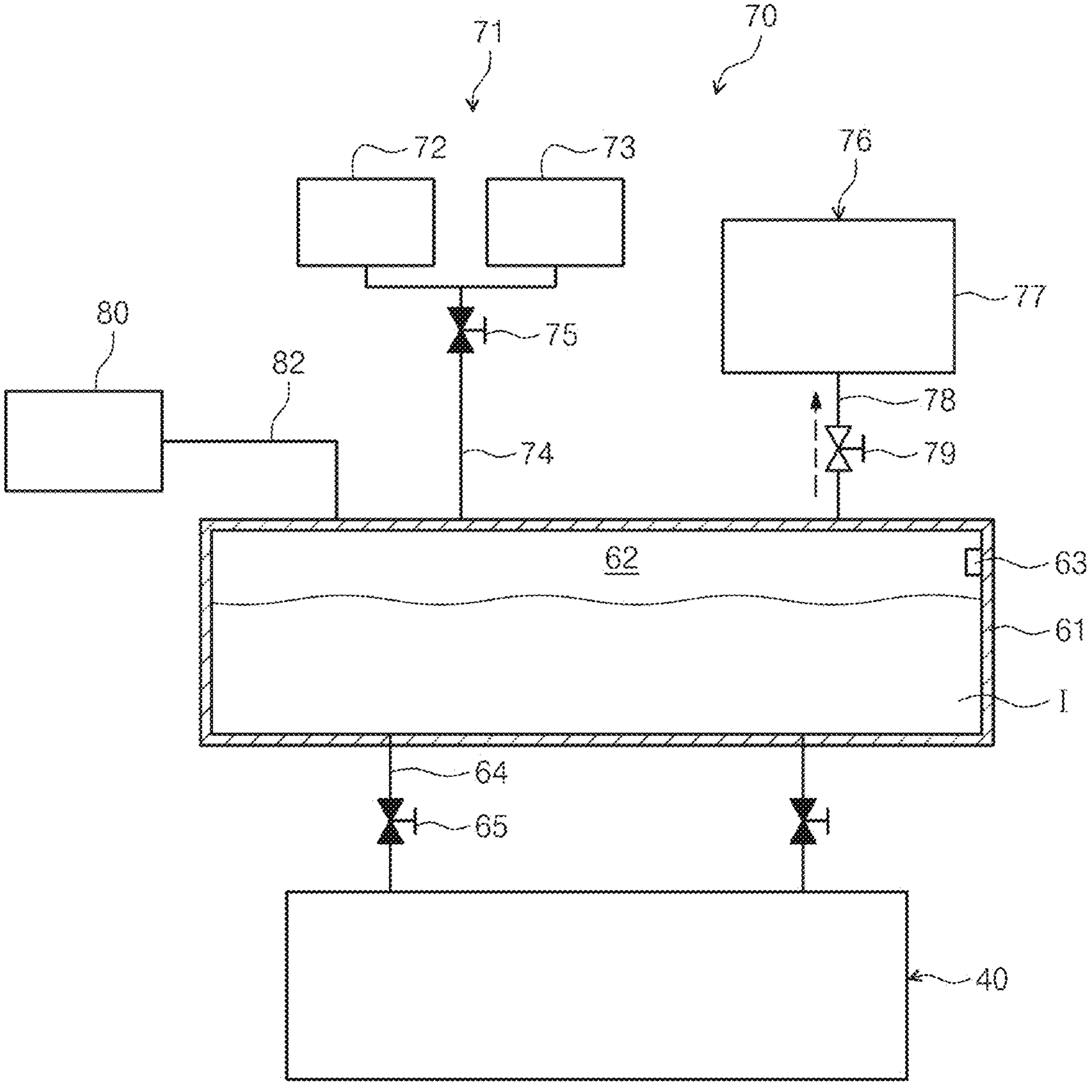
FIG. 6 illustrates a state of the head unit, the supply unit, and the pressure adjusting unit in a first time period of an adjusting a pressure of the inner space to a second pressure of FIG. 4.
Figure 7:
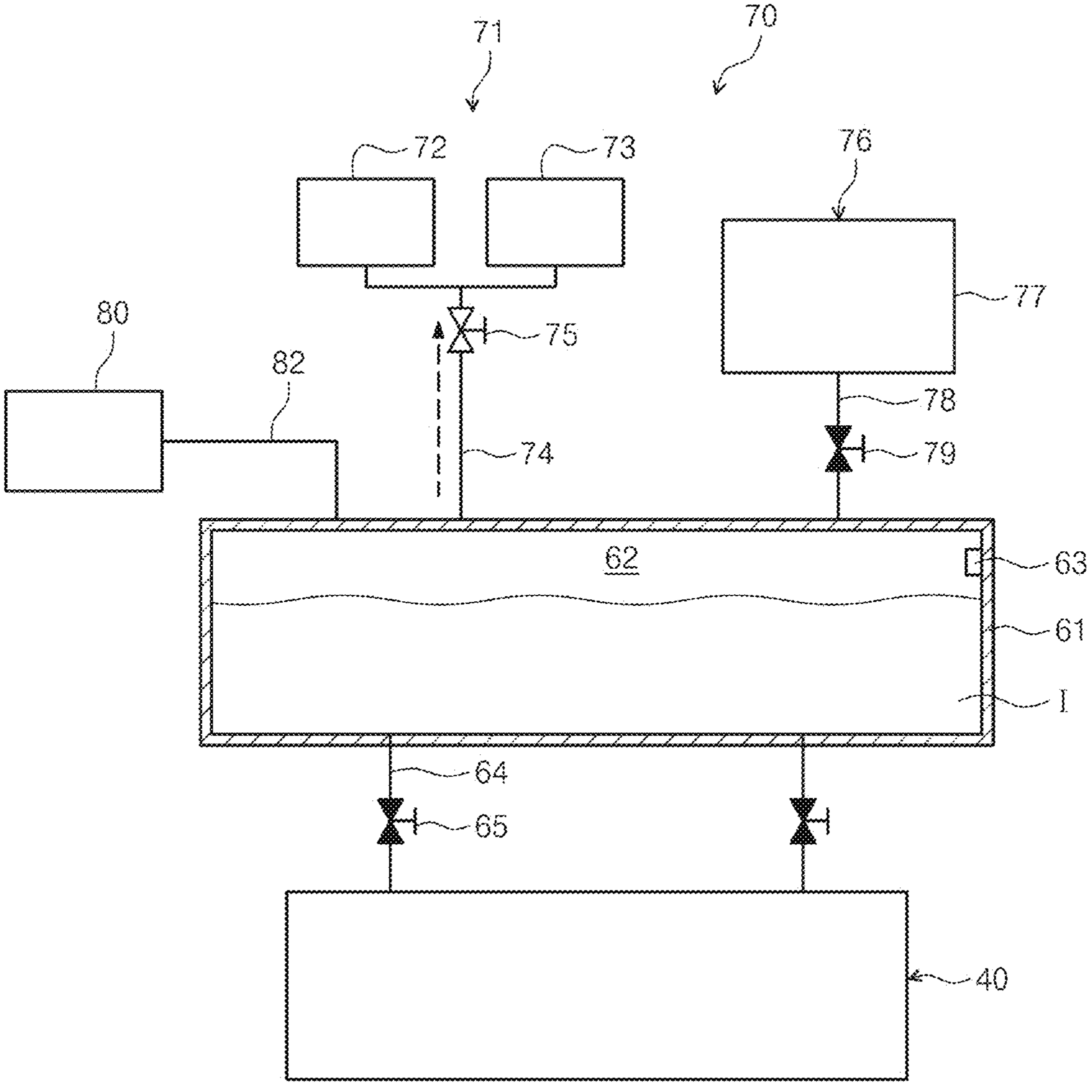
FIG. 7 illustrates a state of the head unit, the supply unit, and the pressure adjusting unit in a second time period of the adjusting the pressure of the inner space to the second pressure of FIG. 4.

FIG. 4 is a flowchart illustrating a control method of the substrate treating apparatus according to an embodiment of the inventive concept. To perform the control method of the substrate treating apparatus 100 described below, the controller 90 may control the components of the substrate treating apparatus 100.

Referring to FIG. 4, the control method of the substrate treating apparatus according to an embodiment of the inventive concept may include a pressurizing step S00, a first pressure adjusting step S10, and a second pressure adjusting step S20. The pressurizing step S00, the first pressure adjusting step S10, and the second pressure adjusting step may be sequentially performed.

The pressurizing step S00 may be a step of increasing the pressure of the inner space 62. In the pressurizing step S00, the pressure of the inner space 62 may be increased from the negative pressure to the atmospheric pressure. For example, if supplying the ink I from the canister 80 to the inner space 62, it is necessary to change the inner space 62 from the negative pressure (e.g., about −5 Kpa, to maintain the meniscus state described later) to the atmospheric pressure. The first pressure adjusting unit 71 may increase the pressure of the inner space 62 from the negative pressure to the atmospheric pressure by opening the inner space 62 to the atmospheric pressure (see FIG. 5).

In the first pressure adjusting step S10, the pressure of the inner space 62 may be adjusted to a first pressure. The first pressure adjusting step S10 may be performed by the second pressure adjusting unit 76 described above. In the first pressure adjusting step S10, the pressure of the inner space 62 can be adjusted from an initial pressure (e.g., atmospheric pressure) to the first pressure, which is a pressure lower than the initial pressure. The first pressure may be the positive pressure or the negative pressure. A pressure change amount of the inner space 62 per unit time in the first pressure adjusting step S10 may be greater than the pressure change amount of the inner space 62 per unit time in the second pressure adjusting step S20 to be described later. That is, in the first pressure adjusting step S10, the first pressure, which is a pressure lower than the initial pressure, may be reached at a high speed (see FIG. 6).

The second pressure adjusting step S20 may be performed after the first pressure adjusting step S10. A change from the first pressure adjusting step (S10) to the second pressure adjusting step S20 may be performed based on a pressure value measured by the pressure measuring sensor 63. For example, if the pressure value measured by the pressure measuring sensor 63 reaches a predetermined pressure (e.g., −3 Kpa), the opening and closing states of the depressurizing valve 79 and the servo valve 75 may be switched. The controller 90 may generate a control signal for switching the opening and closing states of the depressurizing valve 79 and the servo valve 75 based on the pressure value measured by the pressure measuring sensor 63.

In the second pressure adjusting step S20, the pressure of the inner space 62 may be adjusted from the first pressure to the second pressure. The second pressure may be a pressure different from the first pressure and the initial pressure. The second pressure may be a pressure lower than the first pressure. The second pressure may be the negative pressure. For example, the second pressure may be about −5 Kpa. The second pressure adjusting step S20 may be performed by the first pressure adjusting unit 71. The pressure change amount of the inner space 62 per unit time in the second pressure adjusting step S20 may be greater than the pressure change amount of the inner space 62 per unit time in the first pressure adjusting step S10. In addition, as described above, the second pressure adjusting step S20 is performed by the first pressure adjusting unit 71 having relatively an excellent pressure control precision (see FIG. 7). Accordingly, in the second pressure adjusting step S20, the pressure of the inner space 62 may be precisely controlled.

Figure 8:
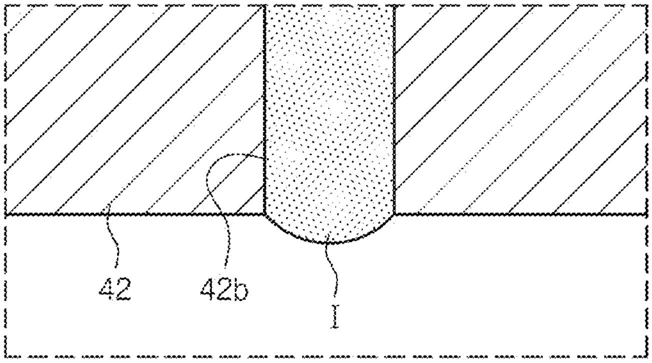
FIG. 8 and FIG. 9 illustrate a state in which an ink existing at an end of a nozzle is converted into a meniscus state in the adjusting the pressure of the inner space to the second pressure.
Figure 9:
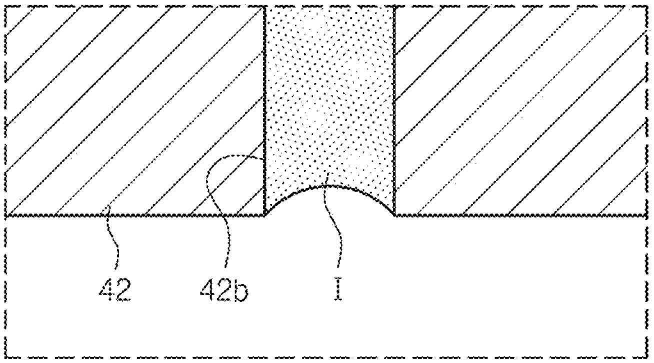

If the pressure of the inner space 62 reaches the negative pressure, the ink I at the end portion of the nozzle 42*b* is sucked upward, maintaining the meniscus state in which the ink I forms a concave-shaped liquid film toward an inside the nozzle 42*b* (see FIG. 8 and FIG. 9).

In addition, if it takes a lot of time for the pressure of the inner space 62 to change from the positive pressure to the negative pressure, the ink I is pulled downward by gravity, solidifying at the end portion of the nozzle 42*b*, or flowing down along the nozzle 42*a*, but the inventive concept may minimize an occurrence of the above-mentioned problem by controlling the pressure in the inner space 62 with two systems using the second pressure adjusting unit 76 which rapidly changes the pressure and the first pressure adjusting unit 71 that precisely controls the pressure.

In addition, in the above example, the pressurizing step S00 has been described as an example of changing the pressure in the inner space 62 from the negative pressure to the atmospheric pressure, but is not limited to this. For example, the head unit 40 may require a purging as necessary. In order for the head unit 40 to spit out an unused ink I remaining in the nozzle 42*b* of the head unit 40, a purging for the head unit 40 may be required. The purging may be performed by transferring an ink stored in the inner space 62 to the head unit 40. For example, the purging may be performed by the first pressure adjusting unit 71 providing the positive pressure to the inner space 62, or by the canister 80 by supplying ink to the inner space 62 to pressurize the inner space 62.

Figure 10:
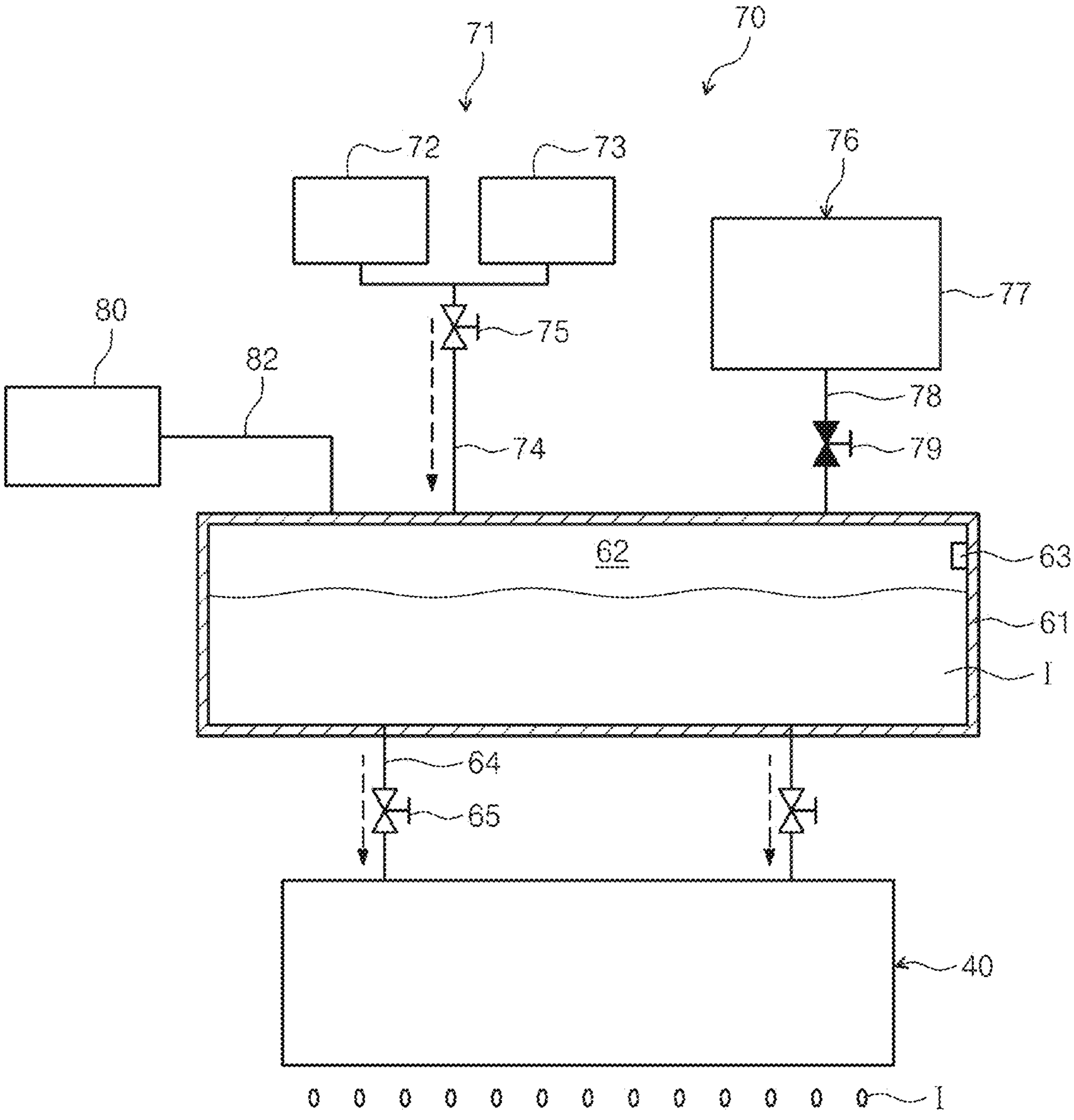
FIG. 10 illustrates another example of the head unit, the supply unit, and the pressure adjusting unit in the adjusting the pressure of the inner space to the first pressure of FIG. 4.

The purging of the head unit 40 may be performed by supplying an inert gas, such as nitrogen gas, to the inner space 62 and pressurizing the inner space 62 to a high pressure of about 200 Kpa (see FIG. 10). After the inner space 62 is pressurized to a high pressure of about 200 Kpa, it may take a lot of time to switch back to the negative pressure of about −5 Kpa. However, the inventive concept can effectively shorten the time required for a large pressure change by providing the second pressure adjusting unit 76 which has a large amount of pressure change per unit time.

In the above-described example, the substrate S is transferred by the transfer unit 70 and the position of the head unit 40 is fixed in the printing process with respect to the substrate S, but the inventive concept is not limited thereto. For example, during the printing process, the position of the substrate S may be fixed, and the position of the head unit 40 may be changed. That is, a movement of the substrate S should be understood as a concept in which a relative position between the substrate S and the head unit 40 change.

The effects of the inventive concept are not limited to the above-mentioned effects, and the unmentioned effects can be clearly understood by those skilled in the art to which the inventive concept pertains from the specification and the accompanying drawings.

Although the preferred embodiment of the inventive concept has been illustrated and described until now, the inventive concept is not limited to the above-described specific embodiment, and it is noted that an ordinary person in the art, to which the inventive concept pertains, may be variously carry out the inventive concept without departing from the essence of the inventive concept claimed in the claims and the modifications should not be construed separately from the technical spirit or prospect of the inventive concept.

What is claimed is:

1. A substrate treating apparatus comprising:
a head unit configured to discharge an ink to a substrate;
a supply unit configured to supply the ink to the head unit and including a reservoir having an inner space; and
a pressure adjusting unit configured to adjust a pressure of the inner space, and
wherein the pressure adjusting unit comprises:
a first pressure adjusting unit; and
a second pressure adjusting unit,
wherein the first and second pressure adjusting units are configured to operate such that a rate of change for changing the pressure of the inner space while operating the second pressure adjusting unit is greater than a rate of change while operating the first pressure adjusting unit, and
wherein the second pressure adjusting unit comprises;
a depressurizing member configured to depressurize the inner space during an operation;
a depressurizing line between the depressurizing member and the inner space; and
a depressurizing valve connected to the depressurizing line configured to isolate the second pressure adjusting unit from the reservoir when the first pressure adjusting unit is in operation.

2. The substrate treating apparatus of claim 1 further comprising a controller for controlling the pressure adjusting unit, and
wherein the controller is configured to control the pressure adjusting unit to adjust pressure of the inner space by in a sequential manner, such that the second pressure adjusting unit changes the pressure of the inner space to a first pressure, and the first pressure adjusting unit changes the pressure of the inner space from a first pressure to a second pressure which is different from the first pressure.

3. The substrate treating apparatus of claim 2, wherein an initial pressure of the inner space at a start of an operation of the pressure adjusting unit is at atmospheric pressure or at a positive pressure, and the first pressure is at a negative pressure.

4. The substrate treating apparatus of claim 2, wherein the supply unit further comprises a pressure measuring sensor configured to measure the pressure of the inner space.

5. The substrate treating apparatus of claim 4, wherein the controller is configured to control the pressure adjusting unit such that the first pressure adjusting unit adjusts the pressure of the inner space after the pressure of the inner space measured by the pressure measuring sensor reaches a pressure.

6. The substrate treating apparatus of claim 1, wherein the first pressure adjusting unit comprises:

a positive pressure providing member configured to provide a positive pressure to the inner space;

a negative pressure providing member configured to provide a negative pressure to the inner space; and a pressure line transferring a pressure provided by the positive pressure providing member or the negative pressure providing member to the inner space.

7. The substrate treating apparatus of claim 6, wherein the first pressure adjusting unit further comprises a servo valve installed between the reservoir and at least one of the positive pressure providing member or the negative pressure providing member.

8. The substrate treating apparatus of claim 1, wherein a supply line including a supply valve is between the head unit and reservoir, and the supply valve is configured to control an amount of the ink transferred to the head unit through the supply line.

9. The substrate treating apparatus of claim 8, wherein the supply valve is an on/off valve.

10. The substrate treating apparatus of claim 8, wherein the supply valve is a flow rate control valve.

11. The substrate treating apparatus of claim 7, wherein the servo valve is configured to isolate the first pressure adjusting unit from the reservoir when the second pressure adjusting unit is in operation.

* * * * *